F. G. NORMAN.
VEHICLE.
APPLICATION FILED MAY 24, 1915.

1,261,428.

Patented Apr. 2, 1918.
4 SHEETS—SHEET 1.

Frank George Norman,
Inventor
by
Bakewell, Byrnes & Parmelee
Attorneys

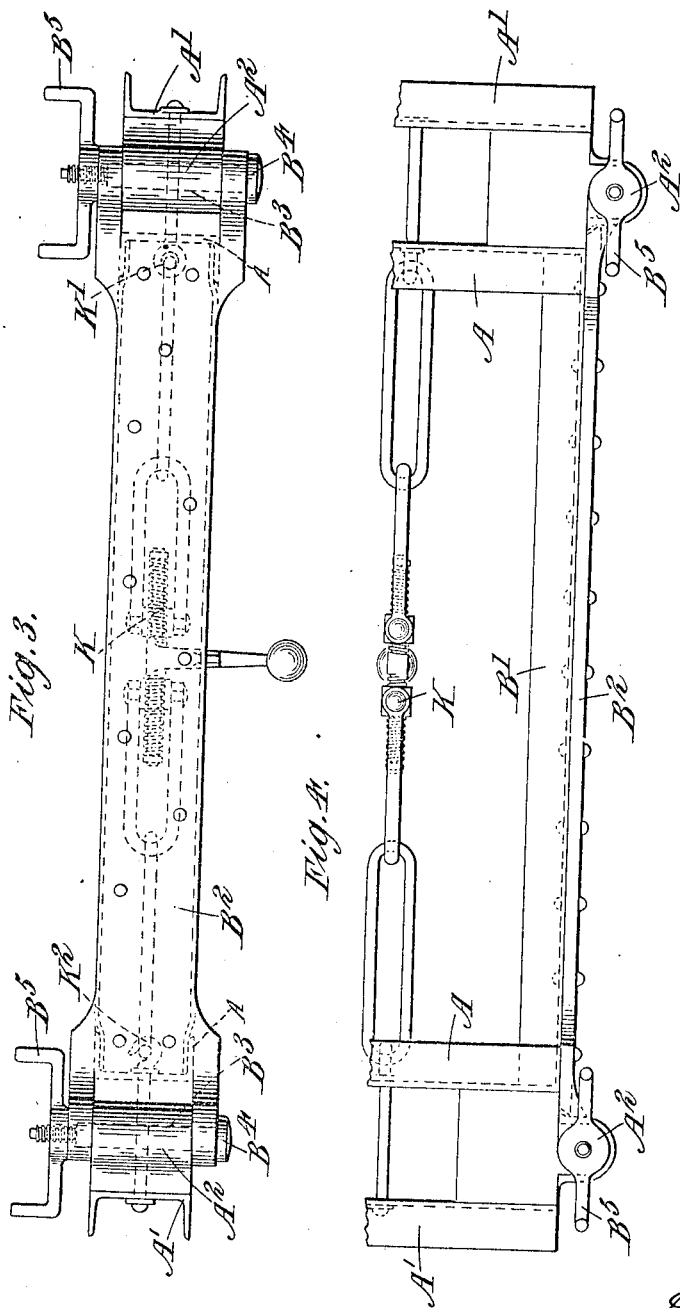

F. G. NORMAN.
VEHICLE.
APPLICATION FILED MAY 24, 1915.
1,261,428.
Patented Apr. 2, 1918.
4 SHEETS—SHEET 3.
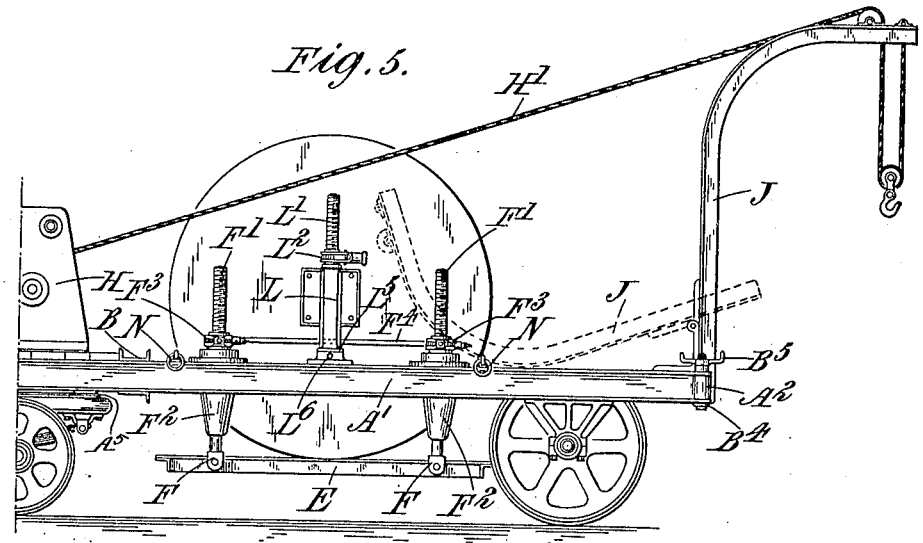
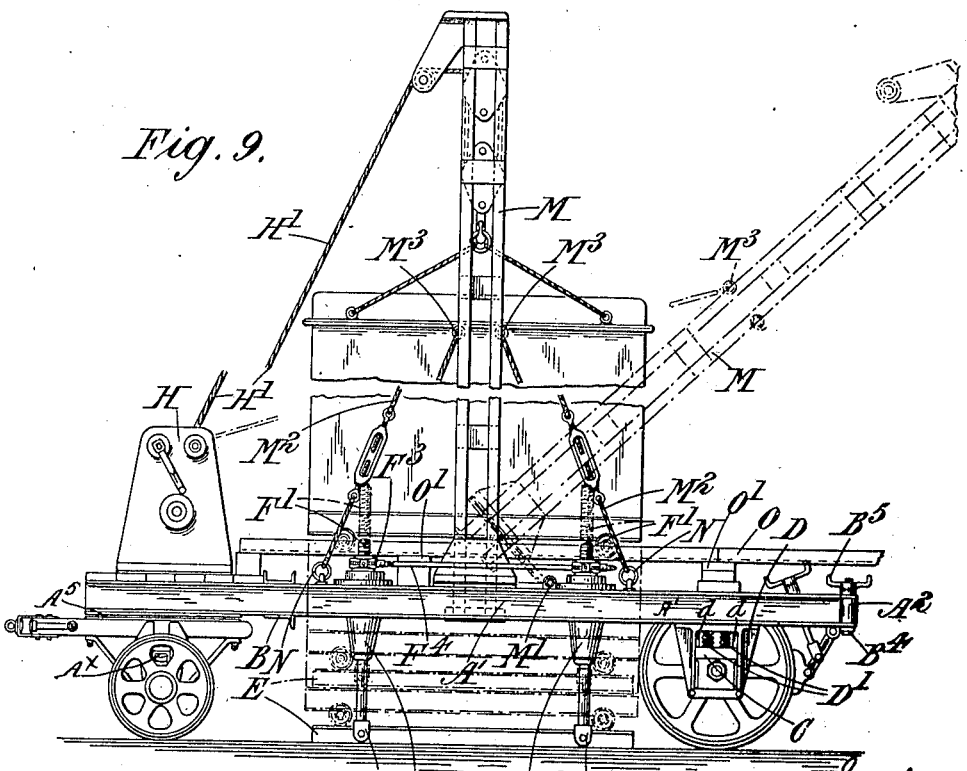

F. G. NORMAN.
VEHICLE.
APPLICATION FILED MAY 24, 1915.

1,261,428.

Patented Apr. 2, 1918.
4 SHEETS—SHEET 4.

UNITED STATES PATENT OFFICE.

FRANK GEORGE NORMAN, OF CARDIFF, WALES.

VEHICLE.

1,261,428.

Specification of Letters Patent.

Patented Apr. 2, 1918.

Application filed May 24, 1915. Serial No. 30,020.

*To all whom it may concern:*

Be it known that I, FRANK GEORGE NORMAN, a subject of the King of England, residing at Cardiff, in Glamorgan, Wales, have invented certain new and useful Improvements in Vehicles, of which the following is a specification.

This invention is for improvements in or relating to vehicles and has for one of its objects to provide for the transportation of heavy articles such as transformers, cable drums, castings, heavy machinery and the like from place to place with the minimum expenditure of labor and power and without that risk which is always present when bulky articles or heavy delicate machinery are transported by unsuitable vehicles.

The present invention consists in the combination, in a vehicle for transporting cable drums and other heavy articles with a lifting device comprising a table carried by a plurality of screw-jacks, of an independent support with bearings to receive the axle of the cable drum.

Preferably the jacks supporting the table are coupled together or provided with means whereby they are operated in pairs or all simultaneously.

Other features of the invention relate to certain constructional arrangements and further improvements in vehicles and for a more complete understanding of the invention reference is directed to the accompanying drawings which show certain forms of vehicle according to the present invention.

In the drawings:—

Fig. 3 is an end elevation of certain parts toward the rear of the vehicle, the parts being shown on a scale larger than that of Figs. 1 and 2;

Fig. 4 is a plan of the parts shown in Fig. 3.

Fig. 5 is a side elevation of a portion of a vehicle of a construction differing from that of the preceding figures;

Fig. 9 is a side elevation of another construction of vehicle.

Like letters of reference refer to like parts throughout the drawings.

Figure 1:
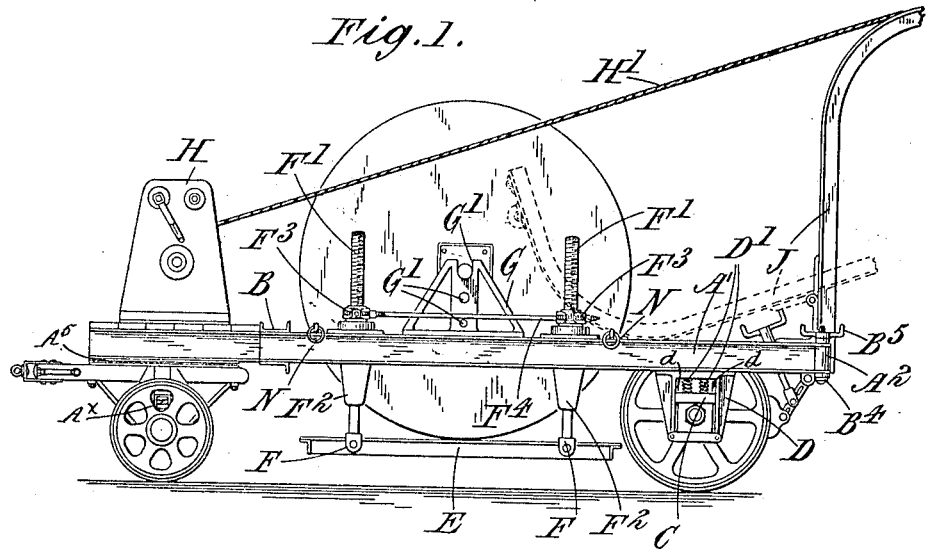
Figure 1 is a side elevation of one form of vehicle according to the present invention showing a cable drum in position thereon.
Figure 2:
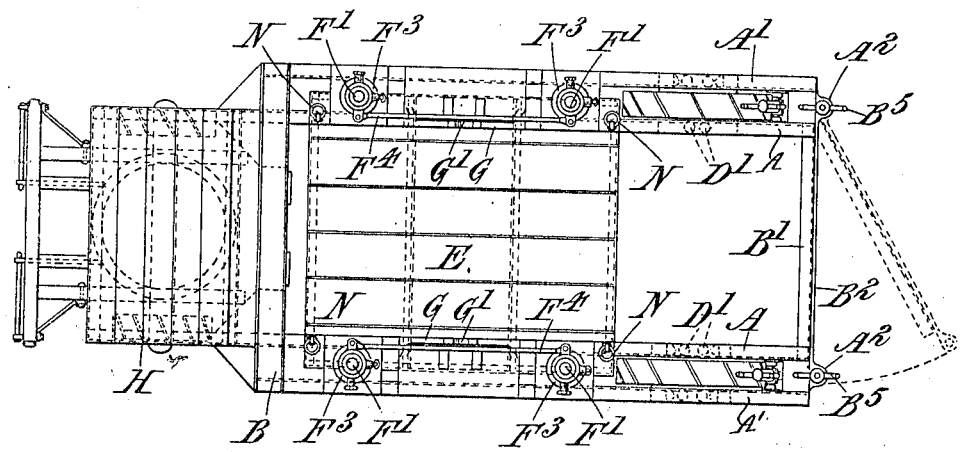
Fig. 2 is a plan of the vehicle shown in Fig. 1, but with the crane omitted.
Figure 6:
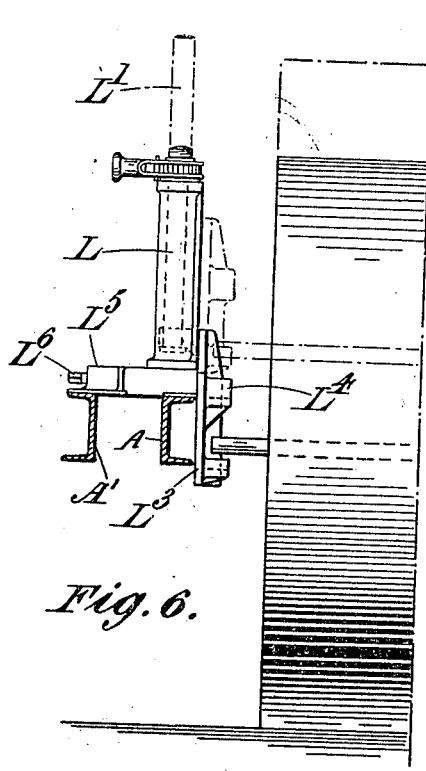
Fig. 6 is an end elevation of certain parts shown in Fig. 5.

Referring now more particularly to Figs. 1 and 2 the vehicle frame may conveniently be constructed of two sets of steel channels A, A¹ tied together transversely by cross bars B, B¹. The frame is supported on any desired number of wheels (four shown) with any suitable spring or other mounting. In the construction shown in Figs. 1 and 2 the vehicle frame is mounted on the front wheels by a transverse leaf-spring, AX, so that the front axle may be arranged to rock or tip with relation to the body to safeguard the frame from stress caused by the passage of the vehicle over uneven ground. The rear wheels of the vehicle are carried in mountings such that each wheel is supported upon a short axle not extending across the central portion of the width of the frame. As shown in Figs. 1 and 2 the rear axles are mounted in axle blocks C arranged to move in brackets D supported on the frame members A and A¹ of the vehicle. Springs D¹ are fitted between the axle blocks C and the brackets D and may be retained in position in any desired manner. The axle blocks C are also recessed to receive guides d on the brackets D, there being two such blocks for the stub axles of the rear wheels, one being mounted in a bracket D connected to the channel A, while the other is mounted in a similar bracket connected to the channel A¹. The diameter of the front wheels being less than the distance between the ground and the bottom of the channel members A and A¹, it will readily be understood that the vehicle can be turned within its own length, as the wheels are adapted to pass under the frame of the vehicle, the trucks therefor being connected to the front portion of the frame by means of a fifth wheel $A^5$.

The vehicle may be driven by power or be fitted for horse draft, or again it may be constructed as a trailer. Where the vehicle takes the form of a wagon with four wheels, the load will usually be carried between the wheels and not immediately over them.

Carried by the vehicle frame is a load-receiving and lifting platform E which is arranged to be lowered and raised in the frame to and from the ground or a level in proximity to the ground line. This platform is carried on the vehicle frame by four inverted screw jacks F spaced apart around the periphery of the platform. The screw jacks F comprise rods $F^1$ threaded along a portion of their length and connected at one end to the platform E. The rods $F^1$ pass through casings $F^2$ carried by the frame-work of the vehicle, and are operated upon by nuts $F^3$. In the drawings ratchet nuts are shown which may be operated by tommy bars. The ratchet nuts may be mounted upon ball thrust bearings of any suitable character and may be coupled together into sets as by the connecting rods $F^4$. By this means a small number of men will be required to operate the nuts (particularly when the load is light), while at the same time the nuts will be prevented from pinching or binding upon the rods $F^1$, or the latter from pinching in the casings $F^2$, owing to one corner of the platform being lowered more quickly than an adjacent corner.

The platform E is preferably situated toward the center of the frame and a portion of the latter, conveniently the back cross tie bar $B^1$ is hinged or otherwise made movable to permit a load to be readily placed on the platform.

Referring to Figs. 1 to 4 it will be seen that the cross-bar $B^1$ is of such a length as to fit between the flanges of the channel members A, $A^1$ of the frame. To the bar $B^1$ is riveted a strip $B^2$ having its ends shaped to fit over blocks $A^2$ carried by the side channel members. Holes $B^3$, which may be tapered, are formed in the blocks $A^2$ and in the ends of the bar $B^2$, and when the composite bar $B^1$, $B^2$ is in position in the frame, pins $B^4$ having threaded ends are pushed up from the underside through the holes. Nuts $B^5$ are then placed on the threaded ends of the pins $B^4$ and the bar $B^1$, $B^2$ tightened up in place. The bar $B^1$, $B^2$ will then securely tie the rear portion of the frame together. It will be seen that the composite bar $B^1$, $B^2$ may either be opened after the fashion of a gate by removing only one of the pins $B^4$, or if thought desirable the bar $B^1$, $B^2$ may be completely removed by taking out both of the pins $B^4$.

In Figs. 1 and 2 it will be seen that the vehicle frame carries supporting brackets G which are so constructed and situated that in suitable cases the load is conveniently transportable to them with the aid of the platform E. Where cable drums or similar loads are being dealt with the brackets G conveniently have bearings $G^1$ to receive an axle which is placed through an aperture in the center of the drum or other article. In this case the whole of the weight of the drum may be carried by the brackets G, so that the drum may rotate in the latter in proximity to the platform E which latter may be arranged to apply frictional resistance to the rotation of the drum to regulate say the unwinding of the cable from it. The aforesaid brackets G may be arranged to accommodate at different heights drums or the like of different dimensions.

It will be seen that the vehicle frame carries at its forward end a winch H and at its rear end a crane attachment J to coöperate with the winch. This crane J which I have shown in Figs. 1 and 5, but for clearness have omitted the same from Fig. 2, may consist of one or more curved arms hinged upon the frame and may be both bolted up in its upright position and be folded over on the frame when desired. By means of the crane and winch just described loads may be drawn on to the platform E from a position inaccessible to the whole vehicle, or by fastening the winding ropes to a suitable anchorage the vehicle may be drawn out of soft ground or into a position where the horses or engine could not take it. Cables may also be drawn through their conduits by the winch and such articles as telegraph poles loaded upon the vehicle by the crane and winch. Suitable bridge attachments or similar fixtures may be provided on the vehicle for carrying the poles, and the erection of the latter will be facilitated by the use of the crane and winch.

Referring now to Figs. 3 and 4 there is shown therein a screw coupling K connected by an eye $K^1$ to the channel member $A^1$ and adapted to be connected to a hook $K^2$ on the channel member A. This screw coupling K comprises a bar with right and left-hand threads, and a weighted arm for rotating the bar, and it is useful for drawing the channel members A and $A^1$ up into their correct positions should they have become displaced while loading up the platform E, although of course its use is not essential. When the screw coupling K has done its work the composite bar $B^1$, $B^2$ can readily be locked in its final position. Of course while the platform is being loaded up the chain of the screw coupling is disengaged from the hook $K^2$.

Figure 7:
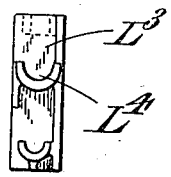
Fig. 7 is a detail view showing in front elevation a certain part in end elevation in Fig. 6.
Figure 8:
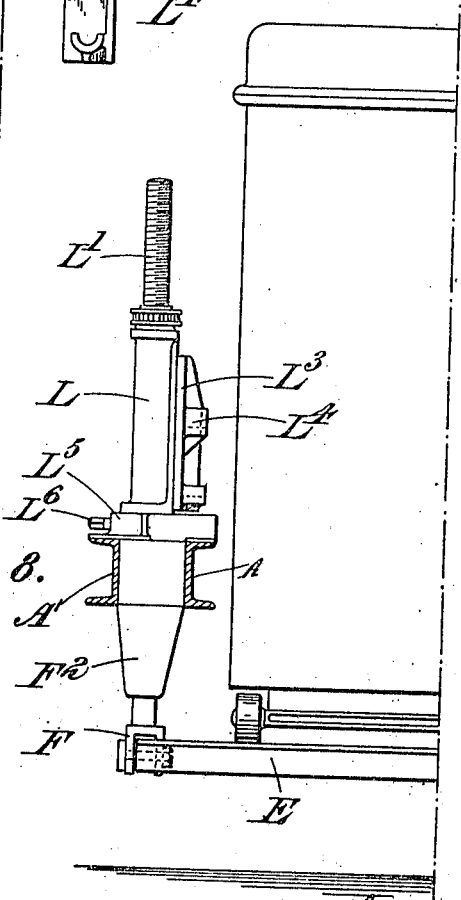
Fig. 8 is an end elevation of certain parts shown in Figs. 5 and 6, but in a different position.

Referring now to Figs. 5 to 8, there is shown therein a construction of vehicle particularly well adapted for transporting cable drums. Instead of utilizing the platform E to raise the cable drums, special cable drum jacks L may be employed. These jacks L are preferably two in number and are situated one on each side of the vehicle. Conveniently they may be mounted in the place occupied by the aforesaid brackets G and if desired the same bolt holes may be utilized for bolting in place both the brackets G and the jacks L since the brackets G and jacks L will not usually be employed simultaneously upon the same vehicle. The jacks L are intended both to raise the drums from the ground and retain them in their raised position, and when the jacks L are employed the platform E may if desired be dismounted although this is not essential. In construction each jack L comprises a threaded bar $L^1$ and a ratchet nut $L^2$ which may be operated, like the nuts $F^3$, by a tommy bar. To the lower end of the bar $L^1$ there is connected a yoke $L^3$ having one or more bearings $L^4$ which are intended to receive the axles of the cable drums. Fig. 7 shows clearly the construction of the yokes $L^3$. Conveniently the jacks L are mounted upon slide-ways $L^5$ carried on the channel bars A, $A^1$ and they may be moved along the slide-ways by rotating a screwed spindle $L^6$. Fig. 8 shows the yoke $L^3$ raised to its highest position and the jack moved back out of operative position. The jacks L are brought into this position when it is desired to lift and transport by the platform E loads such as transformers which cannot conveniently be operated upon by the jacks L. In Fig. 8 the platform E is shown with a transformer upon it.

In Fig. 5 the vehicle is illustrated as having mountings for the front and rear wheels of a different construction from that shown in Fig. 1. Either of these constructions may be adopted as desired.

In some circumstances it is useful to employ a gauntree for transporting the loads from the vehicle to some other situation. In Fig. 9 the vehicle therein shown is provided with a gauntree M which may be of any convenient construction and which is shown as being hinged at $M^1$ to the frame of the vehicle. When not in use the gauntree may be folded over on to the frame and when erect in its operative position may be bolted on the frame through the same bolt holes as serve for bolting the brackets G and jacks L aforesaid in position. The gauntree may also be braced in position by stays $M^2$ connected to rings $M^3$ on the gauntree and N on the frame. The rings N may also be used for bracing the loads in position on the vehicle. The gauntree may be raised into its operative position by means of the winch H, the winch rope $H^1$ being connected for this purpose, as shown in chain lines in Fig. 9, to one of the rings $M^3$. The gauntree is shown in chain lines in Fig. 9 in a partially raised position.

Such a gauntree as is illustrated in Fig. 9 is particularly useful for transferring heavy articles from the vehicle on to say a railway wagon. For this purpose a runway O of any suitable character is laid on the vehicle say on blocks $O^1$ as illustrated so as to be approximately at the height of the floor of the railway wagon, the transformer or other article having previously been raised above this level by the gauntree. The transformer is then disconnected from the gauntree, and from the vehicle if it is braced to the latter, and run off on to the railway wagon. In Fig. 9 the full lines show the transformer ready for transfer along the run-way O and the two sets of chain lines show the transformer firstly with the platform E in its lowest position and secondly with the platform E in its highest position.

In the foregoing description and in the drawings, I have disclosed several forms of devices, but it will readily be understood by those familiar with the art, that various changes may be made in the details of construction and the general arrangement of the parts, without departing from the spirit and scope of my invention as defined in the appended claims.

What I claim as my invention and desire to secure by Letters Patent is:—

1. A combined transporting, loading and unloading device for handling heavy articles, comprising a vehicle having a frame and supporting wheels, a table for receiving the articles to be transported, a plurality of screw jacks connected to the vehicle frame and table and arranged to lift the table relative to the frame, and independent supports on the vehicle frame to support the articles to be transported after they have been elevated by means of the table; said supports being arranged to support the load above the table and independent thereof and in a position to be elevated by the table; substantially as described.

2. A combined transporting, loading and unloading device for handling cable drums or similar articles, comprising a vehicle having a frame and supporting wheels, a table for receiving a cable drum, a plurality of screw jacks connected to the vehicle frame and the table, and arranged to lift the table relative to the frame, and independent supports on the vehicle frame to receive the axle of the drum and support the drum, substantially as described.

3. A combined transporting, loading and unloading device for handling cable drums or similar articles, comprising a vehicle having a frame and supporting wheels, a table for receiving a cable drum, a plurality of screw jacks connected to the vehicle frame and the table, and arranged to lift the table relative to the frame, means for operating said screw jacks in unison, and independent supports on the vehicle frame to receive the axle of the drum and support the drum, substantially as described.

In testimony whereof I have signed my name to this specification in the presence of two subscribing witnesses.

FRANK GEORGE NORMAN.

Witnesses:
JOHN H. BOTSFORD,
THOMAS I. LEONARD.